United States Patent [19]

D'Ambrogio et al.

[11] Patent Number: 5,345,443
[45] Date of Patent: Sep. 6, 1994

[54] NETWORK-BASED DIGITAL BANDWIDTH-ON-DEMAND

[75] Inventors: William J. D'Ambrogio, Oceanport; Wayne D. Phillips, Randolph; Barry S. Seip, New Providence, all of N.J.

[73] Assignee: AT&T Bell Laboratories, Murray Hill, N.J.

[21] Appl. No.: 876,556

[22] Filed: Apr. 30, 1992

[51] Int. Cl.$^5$ .................................. H04Q 11/04
[52] U.S. Cl. ........................ 370/60; 370/60.1
[58] Field of Search ............. 370/60, 60.1, 94.1, 370/110.1, 58.1, 58.2, 58.3; 379/158

[56] References Cited

U.S. PATENT DOCUMENTS

| | | | |
|---|---|---|---|
| 4,761,779 | 8/1988 | Nara et al. | 370/60 |
| 4,985,887 | 1/1991 | Mizuhara et al. | 370/60 |
| 5,038,343 | 8/1991 | Lebizay et al. | 370/60 |
| 5,065,392 | 11/1991 | Sibbitt et al. | 370/58.2 |
| 5,067,125 | 11/1991 | Tsuchida | 370/60 |
| 5,138,614 | 8/1992 | Baumgartner et al. | 370/60 |

FOREIGN PATENT DOCUMENTS 0439098  7/1991  European Pat. Off. ............. 370/60

Primary Examiner—Douglas W. Olms
Assistant Examiner—Ajit Patel
Attorney, Agent, or Firm—Robert P. Marley

[57] ABSTRACT

A method for effecting bandwidth-on-demand, multiple digital channel connections between network subscribers, wherein each of a series of call requests from a given network subscriber to a given recipient establishes a connection via a restricted tandem switching arrangement. The switches within the network facilitating this method are each programmed to utilize inter-switch paths having essentially equivalent electrical delays when effecting connections for calls dialed by network subscribers designated as bandwidth-on-demand users, resulting the virtual elimination of inter-channel differential path delays.

6 Claims, 5 Drawing Sheets

NETWORK-BASED DIGITAL BANDWIDTH-ON-DEMAND

TECHNICAL FIELD

The invention relates to digital transmission systems and, more particularly, to the transmission of digital information via multiple telecommunication channels.

BACKGROUND OF THE INVENTION

Switched digital service ("SDS") telecommunication channels typically have either a 56 or 64 kilobit per second ("kb/s") data rate capacity. This data capacity being determined by the particular environment in which the channel is employed: a standard SDS network, or an Integrated Services Digital Network ("ISDN"). One method of performing data transmissions over a public telecommunication network at rates beyond the standard digital channel capacity is to simultaneously establish connections over multiple SDS channels. For example, if a sender wished to transmit data at a rate N times the standard digital channel data rate, it would be necessary to dial N telephone numbers, whereby establishing the N individual channel connections to N separate receivers on the premises of the intended recipient.

Since each of the individual digital channel connections was established by dialing a separate telephone number, differential path delays will likely exist among the channels. These differential delays arise as a result of dissimilar inter-channel switching, as well as differences in the length of the physical path traversed by each individual connection. Typical network routing practice dictates that the preferred route for a given connection from point A to point B is likely to change from moment to moment as a function of the instantaneous load on the network. As a result, even sequentially dialed calls from point A to point B may not be sent over the same physical path. The caller's inability to specify the particular physical path over which a given channel connection is effected almost guarantees differential delays will exist. To compensate for inter-channel delay differences, the recipient of the multiple calls must introduce a specific delay to each individual channel in order to synchronize the incoming signals. This compensation requires additional on-premises equipment, and a time consuming calibration process to determine the relative path delays among the channels.

An alternative to the communication method described above is to effect the multiple digital channel connections over a network configured so as to guarantee identical path lengths for all of the channels involve. While the capability to selectively restrict multiple digital channel connections to the same transmission path is available within some specialized telecommunication networks, most public telecommunication networks do not offer this function. Furthermore, reconfiguring existing network switches so that they are capable of securing, on-demand, multiple digital channel connections having equal path lengths would be quite costly, requiring a significant investment of both equipment and engineering.

Even within networks having a tandem architecture, wherein all communications between subscribers are restricted to routes traversing a particular switch (designated the tandem switch as it serves to link two other network switches), on-demand, multiple digital channel connections having equal path lengths cannot be reliably secured. This is due to the likelihood that the routing of all the channel connections involved would not be effected via the same network switches or facility routes outside of the tandem switch.

SUMMARY OF THE INVENTION

In accordance with the principles of the invention, a method is provided for effecting on-demand, multiple digital channel connections between network subscribers, wherein each of a series of call requests from a given network subscriber to a given recipient establishes a connection via a restricted tandem switching arrangement. The switches within the network facilitating this method are each programmed to utilize inter-switch paths having essentially equivalent electrical delays when effecting connections for calls dialed by network subscribers designated as bandwidth-on-demand users. As this restricted switching insures an equivalent delay is introduced to each of the multiple channels, a channel demultiplexer at the sending location, and a channel multiplexer at the receiving location (both capable of accommodating the proper number of individual digital channels), are the only special on-premises equipment which the sender and receiver need have to transfer data.

DETAILED DESCRIPTION

Figure 1:
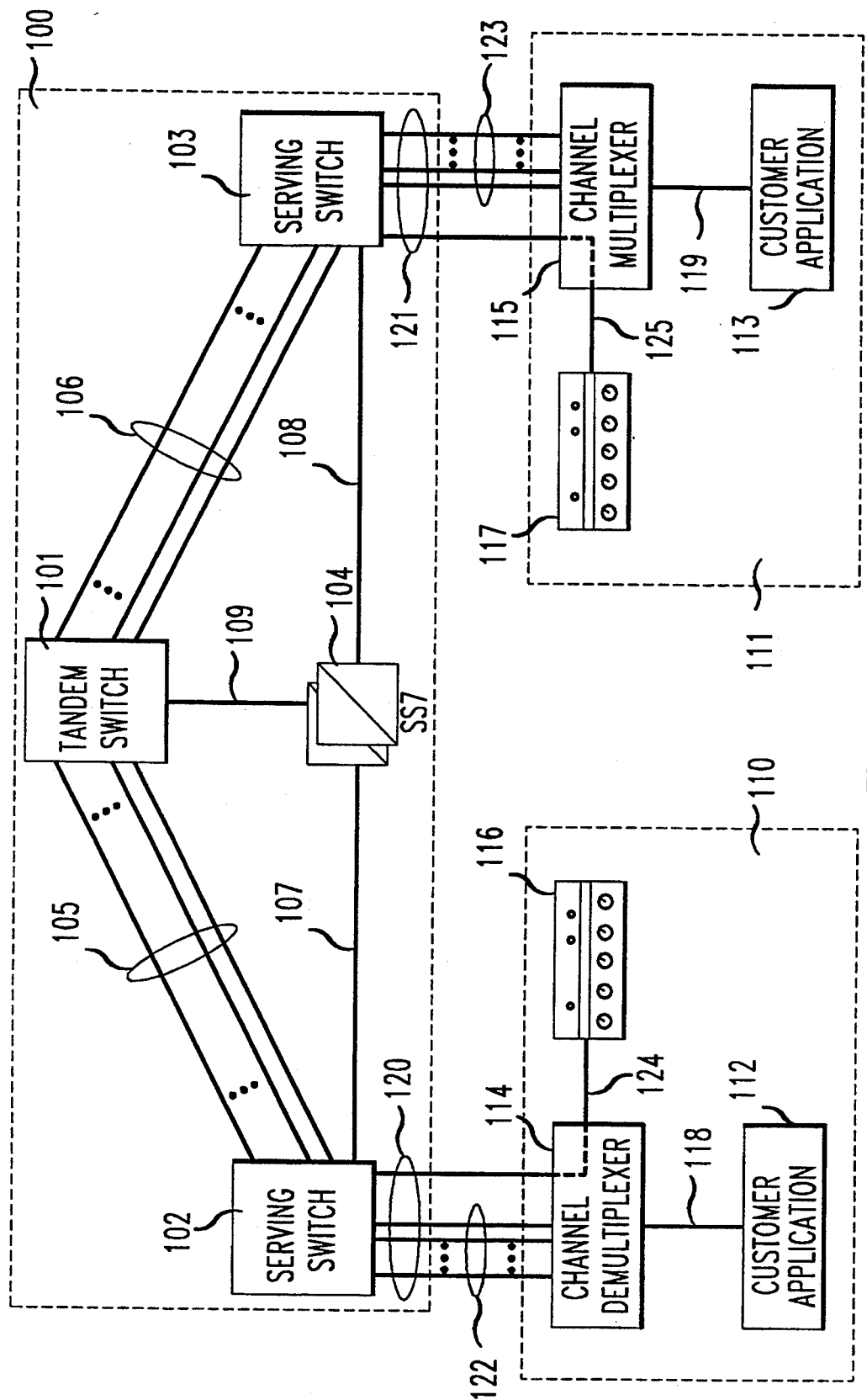
FIG. 1 shows, in simplified block diagram form, an ISDN telecommunication system which facilitates the practice of a method of the invention.

FIG. 1 shows, in simplified form, a public ISDN telecommunication system which facilitates the practice of a particular method of the invention. Specifically shown is ISDN 100 having a restricted tandem switching architecture. ISDN 100 consists of tandem switch 101, serving switches 102 and 103, and Signaling System 7 ("SS7") 104 (an internationally established standard signaling arrangement). Each serving switch may be selectively linked to tandem switch 101 via multiple T1 digital lines; each T1 line supports a DS1 digital signal containing 24 individual DS0 channels. For purposes of illustration, only two T1 lines are depicted, 105 and 106, and only three of the 24 DS0 channels supported within each of these lines are explicitly shown. SS7 104 is linked to tandem switch 101 and serving switches 102 and 103 by digital communication lines 107, 108 and 109.

Figure 2:
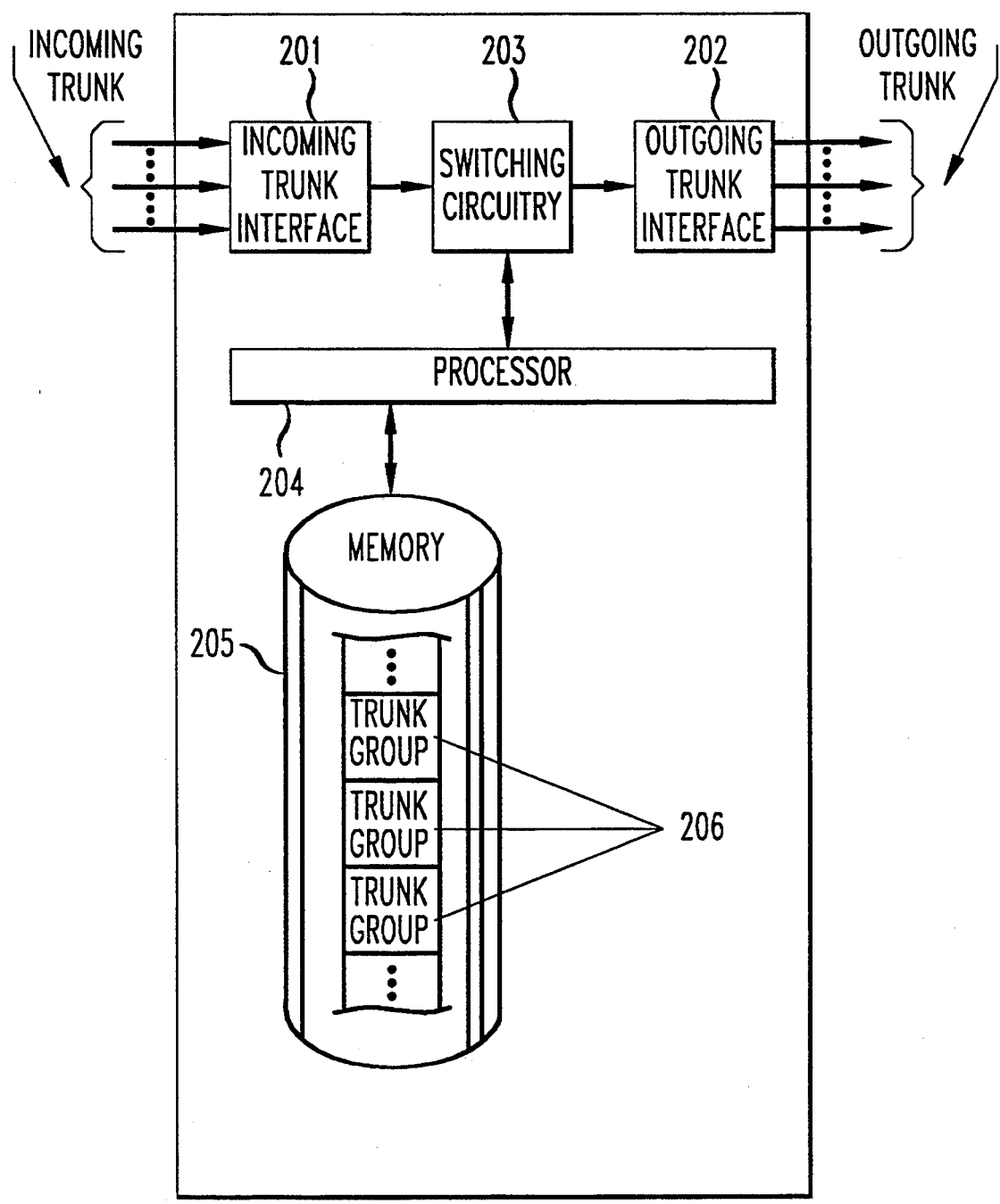
FIG. 2 shows, in simplified block diagram form, the internal architecture of the switches of FIG. 1.

The serving and tandem switches in the above described network are each electronic switching systems having the basic architecture illustrated in FIG. 2. As shown, contained within each electronic switching system are the following components: incoming trunk interface 201, outgoing trunk interface 202, switching circuitry 203, processor 204, and memory 205. Such electronic switching systems are known and commercially available. Stored within memory 205 is an address listing of viable outgoing trunks through which the switch may effect connections. For the serving switches contained within the tandem network, these lists contain the addresses of trunks linking the serving switch and the tandem switch. The trunk listings stored within serving switch memory 205 are arranged into separate groups (206). One of these groups, designated the restricted subscriber domain, contains only the addresses of trunks having practically identical path lengths. In accordance with the invention, the serving switch is programmed to restrict the routing of DS0 calls placed by designated network subscribers to paths having addresses listed within the restricted subscriber domain (i.e., paths having comparable delay characteristics). These paths need not be contained within the same T1 line. The designated bandwidth-on-demand subscribers ("BOD subscribers") would have notified the network provider that they wished to be identified as a user of bandwidth-on-demand capabilities. Programming a switch to route calls received from a particular group of subscribers is well known in the art, and the individual connections to the tandem switch are effected in a known fashion. The memory of tandem switch 101 contains similarly grouped address listing of trunks capable of providing connections to serving switches. In accordance with the invention, tandem switch 101 is programmed to restrict the routing of calls originated by BOD subscribers to paths within a grouping of trunk lines having virtually identical path lengths.

Also shown in FIG. 1, is Customer Premises Equipment ("CPE") 110, which is configured to transmit data over ISDN 100 at a fixed data rate of N×64 kb/s; N being is a fixed integer value between 2 and 23 (inclusive). This CPE is located on the premises of a first BOD subscriber. CPE 110 consists of customer application 112, channel demultiplexer ("DEMUX") 114, and a D-Channel controller ("DCC") 116. Customer application 112 is linked to DEMUX 114 via high-rate data connection 118. DEMUX 114 may be selectively linked to serving switch 102 via Primary Rate Interface ("PRI") 120. PRI 120 provides a 23 channel DS0 connection (labeled 122) to DEMUX 114, as well as a D-Channel signaling connection (labeled 124) to DCC 116.

Customer Premises Equipment ("CPE") 111 is also shown in FIG. 1. This CPE is located on the premises of a second BOD subscriber, and is configured to receive N separate DS0 signals via ISDN 100. Customer application 113 is linked to channel multiplexer ("MUX") 115 via high-rate data connection 119. MUX 115 may be selectively linked to serving switch 103 via PRI 121. PRI 121 provides 23-channel DS0 connection 123 to MUX 115, and D-Channel signaling connection 125 to DCC 117.

In practicing this particular method of the invention, the first BOD subscriber initiates a multiple DS0 channel connection by employing DCC 116 to transmit a D-Channel signaling protocol SETUP message to serving switch 102 via D-Channel signaling connection 124. This protocol SETUP message, which is transmitted within ISDN 100 via SS7 104 and digital communication lines 107, 108 and 109, attempts to establish a single DS0 channel connection between sending CPE 110 and receiving CPE 111. As the network is restricted to tandem routing, the call will be established via a path traversing serving switch 102, tandem switch 101, and serving switch 103. If a path along this facility route is available, a single DS0 channel connection is established. DCC 116 then sequentially initiates (N−1) additional calls to (N−1) individual telephone numbers associated with CPE 111. Each of these additional calls is routed by serving switch 102 and tandem switch 101 over DS0 channels supported by trunks having addresses stored within the subscriber domain listings of the switches. This insures that these additional connections are established over paths having delay characteristics almost identical to that of the initially established connection. CPE 111 answers the calls in sequential order, thereby building up the required N×DS0 bandwidth. Upon establishing the full N×DS0 connection, the first BOD subscriber CPE transmits data at a rate of N×64 kb/s from customer application 112 to DEMUX 114. DEMUX 114 separates the N×64 kb/s rate data into N separate 64 kb/s data signals, and simultaneously transmits each of these 64 kb/s data signals over one of the N DS0 connections established between CPE 110 and CPE 111. MUX 115 of CPE 111 receives the N 64 kb/s data signals, reconstitutes the original N×64 kb/s data signal, and transmits it, via high-rate data connection 119, to customer application 113.

The above described method provides a practical method for effecting multiple DS0 channel connections. However, as the network to which this method is applied is a public network, actually obtaining a multiple DS0 channel connection may require more than one attempt. If, for example, any of the switches engaged in facilitating an N×DS0 transmission attempt have less than N channels available at the time of the attempt, the proper DS0 connections cannot be established between CPE 110 and CPE 111. When this condition exists, a "busy" message is sent to DCC 116, via a D-Channel message, and CPE 110 aborts the attempt to establish an N×DS0 connection. Another attempt to establish the connection may be initiated by CPE 110 immediately thereafter.

Figure 3:
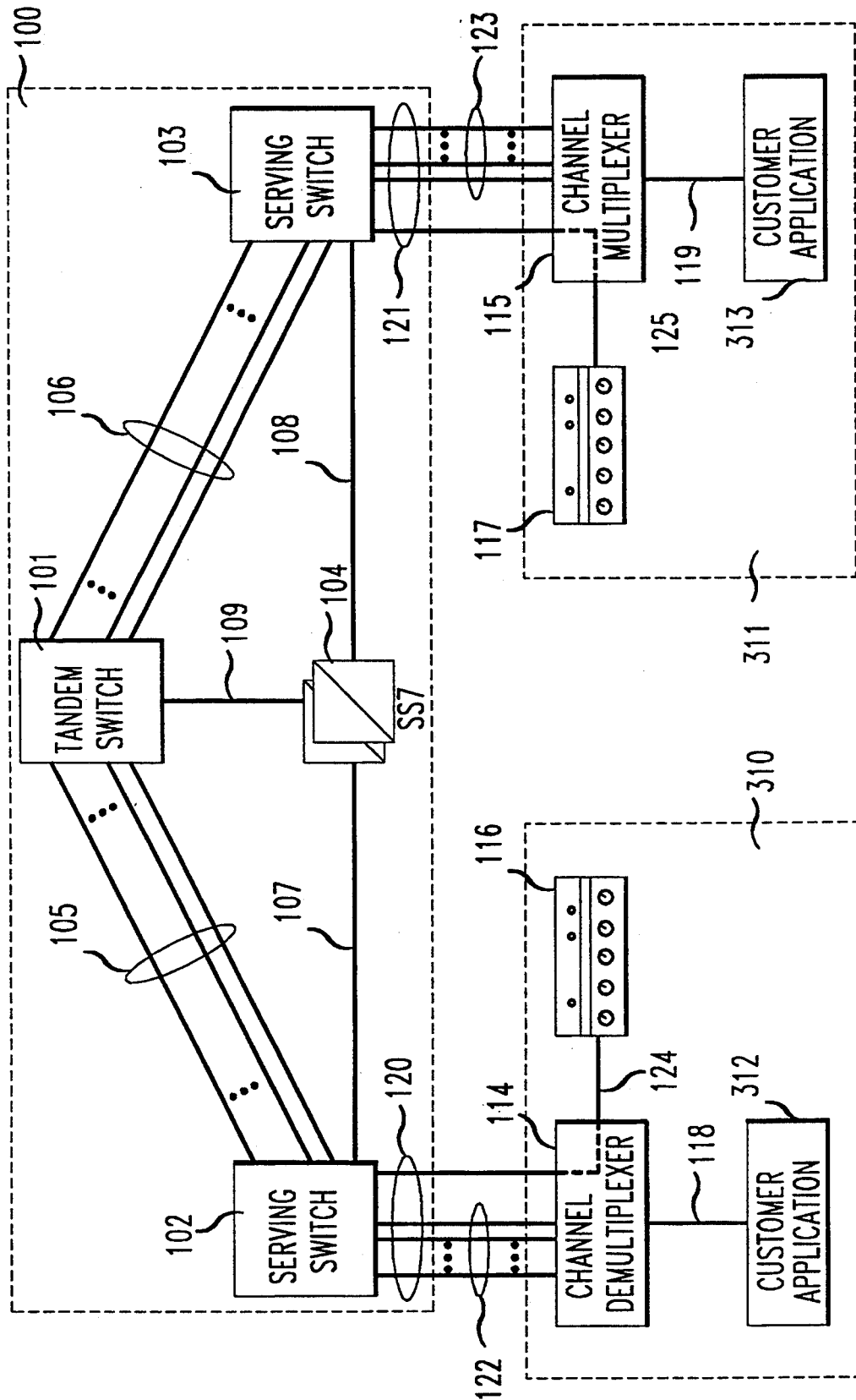
FIG. 3 shows, in simplified block diagram form, an ISDN telecommunication system which facilitates the practice of a second method of the invention.

Another method of the invention may be practiced on ISDN system illustrated in FIG. 3. This system is similar to the system of FIG. 1, however CPE 310 and customer application 312 are configured to have the capability to transmit data at different selectable discrete rates, dependent upon the specific application. The particular transmission rate being I×64 kb/s, where I is an integer between 2 and 23 (inclusive). Similarly, CPE 311 and customer application 313 are configured to have the capability of receiving data at different selectable discrete rates, dependent upon the specific application; the particular reception rate being an integer multiple of 64 kb/s, not exceeding 1472 kb/s (23×64 kb/s). The serving and tandem switches operate in a fashion identical to that of the previously described embodiment.

In practicing the second method of the invention, a multiple DS0 channel connection is initiated by the first BOD subscriber from CPE 310 by generating a D-Channel signaling protocol SETUP message via DCC 116. This protocol SETUP message is generated, transmitted, and responded to by network 100 in a fashion identical to that described in the previous method. If a path along the restricted facility route is available, a single DS0 channel connection is established. CPE 310 then sequentially initiates (I−1) additional calls to (I−1) individual telephone numbers associated with CPE 311; thereby establishing a sufficient number of DS0 channel connections to support the desired transmission bandwidth. As with the previously described method, each of these connections is established over DS0 channels supported by trunks having addresses stored within the subscriber domain listings of the serving and tandem switches. This insures that these additional connections are established over paths having delay characteristics almost identical to that of the initially established connection. CPE 311 sequentially answers the incoming calls, however, CPE 311 is not configured to receive a data signal of a particular fixed bandwidth, and receives no information via SS7 104 as to the total number of DS0 channel connections which will constitute any given multiple DS0 call. To insure that data transmission is not attempted until the correct I times DS0 bandwidth connection has been established, CPE 311 is adapted to enter a waiting state for a predetermined interval (nominally 15 seconds) after the reception of any individual DS0 call. In this waiting state, no data is accepted by CPE 311. If at the end of this predetermined interval, another DS0 call has not been received, customer application 313 within CPE 311 is set to receive data at a bandwidth commensurate with the present number of established DS0 channel connections, and data is accepted. As with the previously described method, if the desired number of DS0 connections cannot be established, a "busy" message is sent to DCC 116 and the transmission attempt is aborted.

In the practicing the two methods described above, the individual calls dialed to build-up the desired bandwidth need not be restricted to calls which establish a single DS0 channel connection. Present ISDN systems offer options to subscribers which allow synchronous data transmission at 384 kb/s to be facilitated by making one call (establishing what is referred to as an "H0" channel connection). This option may be incorporated into the disclosed invention, thereby allowing a 768 kb/s bandwidth connection to be obtained by sequentially dialing two 384 kb/s calls (as opposed to twelve single DS0 calls). In addition, 384 kb/s and 64 kb/s calls may be used in conjunction so as to reduce the number of calls that need be placed to establish other desired bandwidths.

Furthermore, the application of this invention to ISDN systems need not be limited to simultaneously transmitting data via a maximum of 23 individual DS0 channel connections. The 23 DS0 channel connection limitation was mentioned in the above examples merely because the illustrated subscriber CPEs were each shown to be serviced by a single PRI. A single PRI only provides 23 DS0 channels. The method of the invention may be applied to any number of DS0 channel connections, limited only by the capabilities of the particular network and CPEs being employed.

Figure 4:
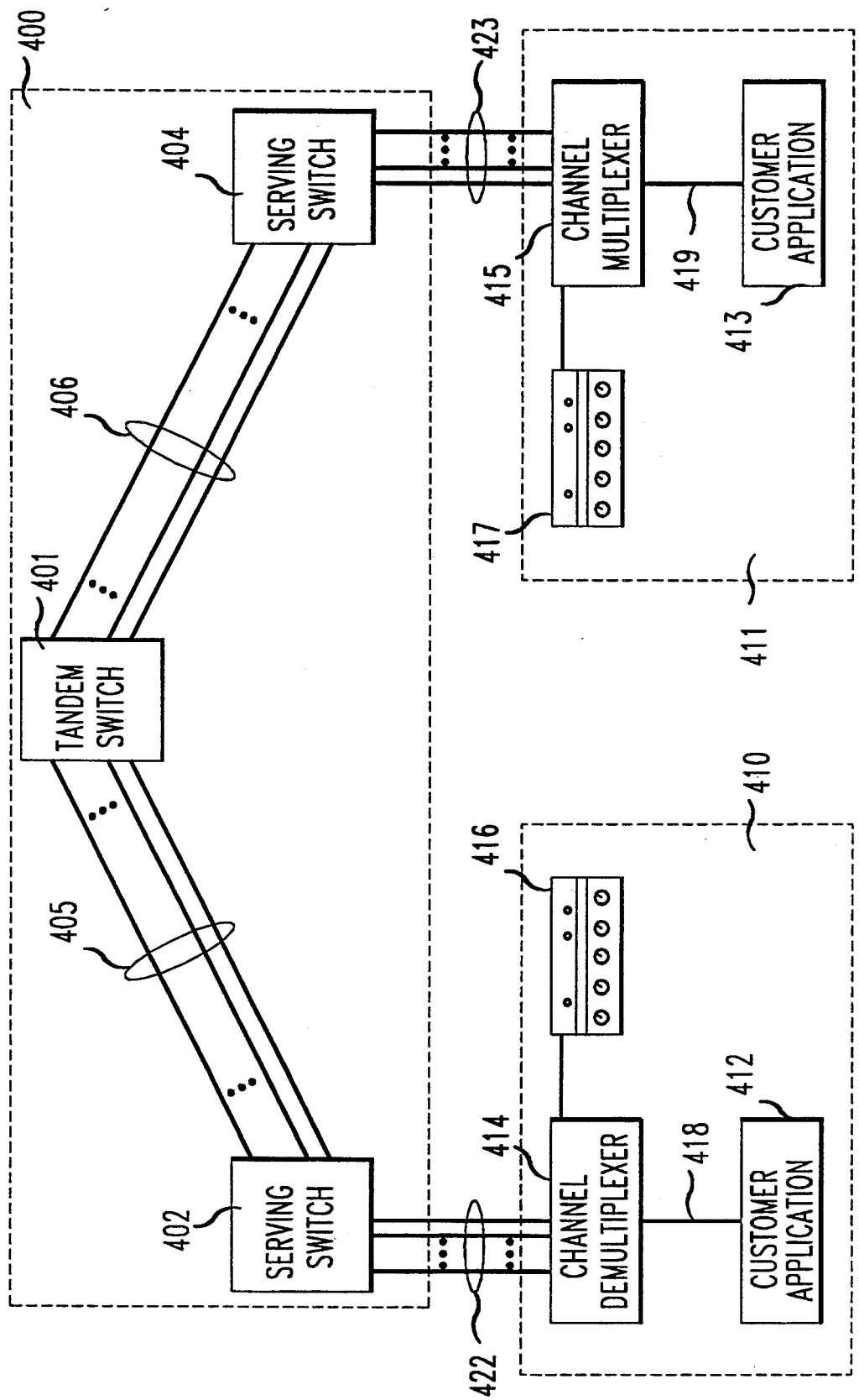
FIG. 4 shows, in simplified block diagram form, an SDS telecommunication system which facilitates the practice of a method of the invention.

FIG. 4 shows, in simplified form, a public SDS telecommunication system which facilitates the practice of a particular method of the invention. Specifically shown is SDS network 400 having a tandem switching architecture. SDS network 400 consists of tandem switch 401, and serving switches 402 and 403. The serving switches may each be selectively linked to tandem switch 401 via multiple T1 digital lines; each T1 line supporting a DS1 digital signal containing 24 individual DS0 channels. For purposes of illustration, only two T1 lines are depicted, 405 and 406, and only three of the 24 DS0 channels contained within each of these lines are explicitly shown. The serving and tandem switches of FIG. 4 are each electronic switching systems having the same basic architecture and memory configuration as the switch illustrated in FIG. 2. DS0 channel connections initiated by a BOD subscriber are effected via inter-switch paths having virtually the same delay. These paths need not be contained within the same T1 line.

Also shown in FIG. 4, are CPE 410 and CPE 411. CPE 410 is located on the premises of a first BOD subscriber, and configured to transmit data over network 400 at a fixed data rate of $N \times 56$ kb/s; where N is a fixed integer value between 2 and 24 (inclusive). CPE 410 consists of customer application 412, DEMUX 414, and controller 416. Customer application 412 is linked to DEMUX 414 via high-rate data connection 418. DEMUX 414 may be selectively linked to serving switch 402 via 24 individual DS0 channels (collectively designated service connection 422). Controller 416 governs the access of DS0 channels by DEMUX 414. CPE 411 is located on the premises of a second BOD subscriber, and is configured to receive N separate DS0 signals via ISDN 400. Customer application 413 is linked to MUX 415 via high-rate data connection 419. MUX 415 may be selectively linked to serving switch 403 via 24 individual DS0 (collectively designated service connection 423). Access to these DS0 channels by MUX 415 is governed by controller 417.

In practicing this particular method of the invention, a multiple DS0 channel connection is established by the first BOD subscriber by sequentially dialing N telephone numbers from CPE 410. Each of the dialed numbers is associated with a receiving port on MUX 415. This dialing is initiated by controller 416 via DEMUX 414. The dialed numbers may be N different telephone numbers, or the same number repeatedly dialed so as to access N lines within a hunt group associated with MUX 415. Each of these additional calls is routed by serving switch 102 and tandem switch 101 over DS0 channels supported by trunks having addresses stored within the subscriber domain listings of the switches. This insures that these additional connections are established over paths having delay characteristics almost identical to that of the initially established connection. CPE 411 answers incoming the calls in sequential order, thereby building up the required $N \times DS0$ bandwidth. Upon establishing the full $N \times DS0$ connection, CPE 410 transmits data at a rate of $N \times 56$ kb/s from customer application 412 to DEMUX 414. DEMUX 414 separates the $N \times 56$ kb/s rate data into N separate 56 kb/s data signals, and simultaneously transmits each of these 56 kb/s data signals over one of the N connections established between CPE 410 and CPE 411. MUX 415 of CPE 411 receives the N 56 kb/s data signals, reconstitutes the original $N \times 56$ kb/s data signal, and transmits it, via high-rate data connection 419, to customer application 413.

As with previously described methods, if the desired number of DS0 channel connections having similar delay characteristics cannot be established, a "busy" message is returned by the network to the sending CPE, and the transmission attempt is aborted. Another attempt to establish N DS0 connections can be initiated by CPE 410 immediately thereafter.

Figure 5:
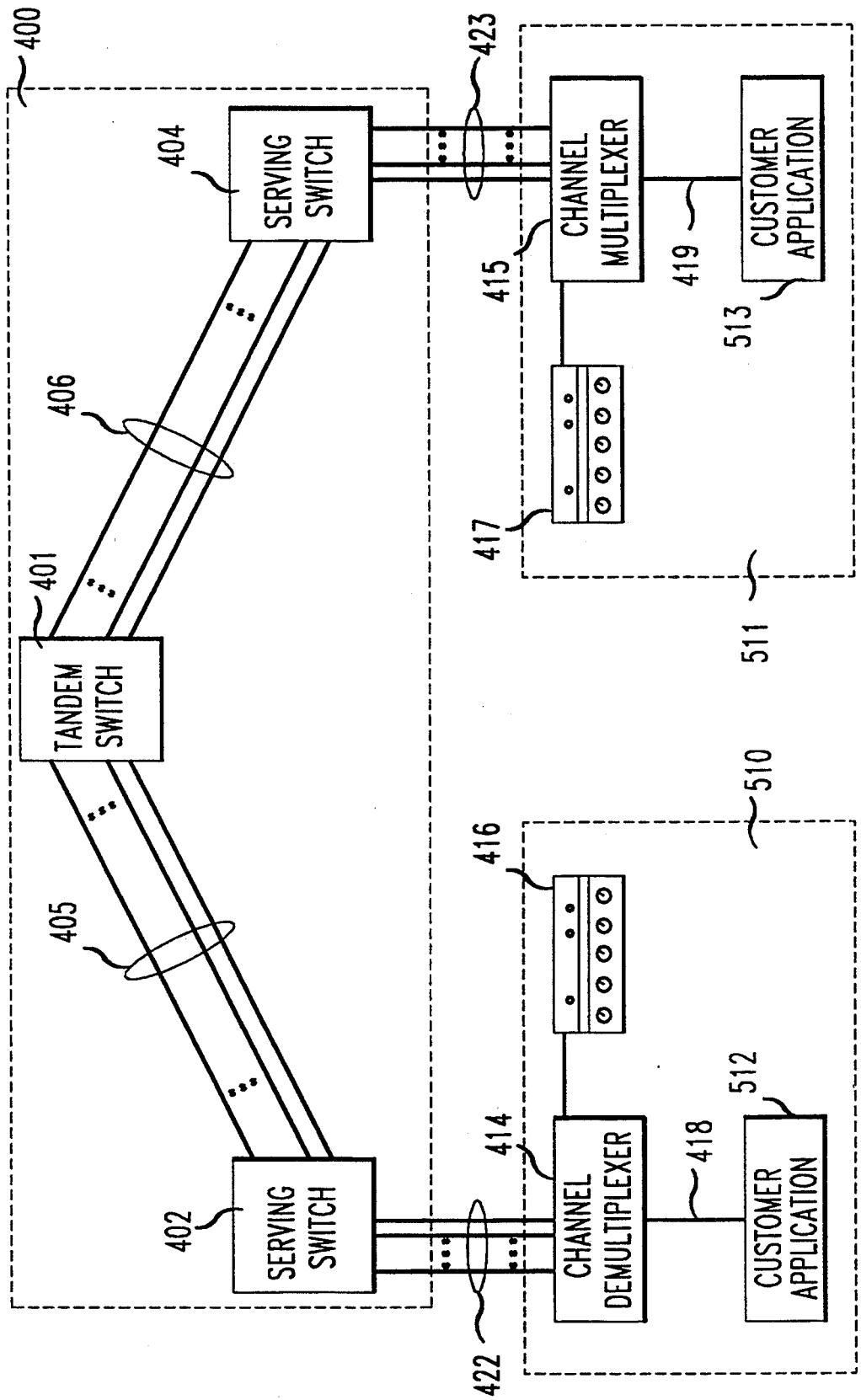
FIG. 5 shows, in simplified block diagram form, an SDS telecommunication system which facilitates the practice of yet another method of the invention.

Yet another method of the invention may be practiced on the SDS telecommunications system illustrated in FIG. 5. This system is similar to the system of FIG. 4, however CPE 510 and customer application 512 are configured to have the capability to transmit data at different selectable discrete rates, dependent upon the specific application. The particular rate of data transmission being I times 56 kb/s, where I is an integer between 2 and 24 (inclusive). Similarly, CPE 511 and customer application 513 are configured to have the capability of receiving data at different selectable discrete rams, dependent upon the specific application; the particular reception rate being an integer multiple of 56 kb/s, not exceeding 1344 kb/s (24×56 kb/s).

In practicing this fourth method, a multiple DS0 channel connection is initiated by the first BOD subscriber from CPE 510 by sequentially dialing N individual telephone numbers, each of which is associated with an a receiving port on MUX 415. This dialing is initiated by controller 416 via DEMUX 414. The dialed numbers may be N different telephone numbers, or the same number repeatedly dialed so as to access N lines within a hunt group associated with MUX 415. As with the previously described method, each of these connections is established over DS0 channels supported by trunks having addresses stored within the subscriber domain listings of the serving and tandem switches. This insures that these additional connections are established over paths having delay characteristics almost identical to that of the initially established connection. CPE 511 sequentially answers each of the calls as they are received, however, CPE 511 is not configured to receive a data signal of a particular fixed bandwidth. To insure that data transmission is not attempted until the correct number of DS0 channel connections have been established between CPE 510 and CPE 511, CPE 511 is adapted to enter a waiting state for a predetermined interval (nominally 15 seconds) after the reception of any individual DS0 call. In this waiting state, no data is accepted by CPE 511. If at the end of this predetermined interval, another DS0 call has not been received, customer application 513 within CPE 511 is set to receive data at a bandwidth commensurate with the number of established DS0 channel connections, and data is accepted. As with the previously described methods, if the desired number of DS0 channel connections cannot be established, a "busy" message is sent to CPE 510 and the transmission attempt aborted.

The application of this invention to SDS systems need not be limited to simultaneously transmitting data via a maximum of 24 individual DS0 channel connections within standard SDS systems. A limitation of 24 DS0 was imposed in the above examples simply because the illustrated BOD subscribers were shown to be serviced by a 24 channel DS0 connection. As with the previously described ISDN applications of this invention, the method of the invention can be applied to any number of DS0 channels, limited only by the capabilities of the particular network and CPEs being employed.

Another advantage of the invention is that the switches and lines which support the restrictive switching required to practice the invention need not be exclusively dedicated to facilitating digital bandwidth-on-demand calls. The switches may be utilized for other services as needed, without any reconfiguration.

The above described methods provide techniques for obtaining multiple digital channel connections which are both practical and cost effective. It will be understood that the particular methods described are only illustrative of the principles of the present invention, and that various modifications could be made by those skilled in the art without departing from the scope and spirit of the present invention, which is limited only by the claims that follow. One such modification might include practicing the invention within a tandem telecommunications system wherein the restricted trunking paths having addresses stored within the domain listings of the serving and tandem switches traverse a plurality of network switches.

We claim:

1. In a digital telecommunication network switching system including:
    a first serving switch;
    a tandem switch;
    a second serving switch;
    a first memory containing stored logical listings corresponding to a group of paths, having substantially identical electrical delays, over which digital channel connections linking said first serving switch and said tandem switch may be effected, said stored logical listings being indexed within said first memory according to the electrical delay of each corresponding path; and
    a second memory containing stored logical listings corresponding to paths, having substantially identical electrical delays, over which digital channel connections linking said tandem switch and said second serving switch may be effected, said stored logical listings being indexed within said first memory according to the electrical delay of each corresponding path;
    a method of effecting on-demand, multiple digital channel connections between a first network subscriber and a second network subscriber, comprising the steps of:
    establishing a digital channel connection between said first network subscriber and said second network subscriber via said first serving switch, said tandem switch, and said second serving switch, in response to each of a plurality of sequential requests from said first network subscriber to initiate a digital channel connection to said second network subscriber, such that a plurality of digital channel connections that traverse paths corresponding to logical listings stored in said first memory which are indexed as having substantially identical electrical delays, are established between said first serving switch and said tandem switch, and a plurality of digital channel connections that traverse paths corresponding to logical listings stored in said second memory which are indexed as having substantially identical electrical delays are established between said tandem switch and said second serving switch.

2. The method of claim 1 wherein said established digital channel connections each support a DS0 channel.

3. The method of claim 1 wherein said digital telecommunication network is a public network.

4. The method of claim 1 wherein said digital telecommunication network is an integrated services digital network.

5. The method of claim 4 wherein said sequential requests from said first network subscriber to initiate a digital channel connection to said second network subscriber are communicated to said serving and network switches via a D-Channel message.

6. In a public integrated services digital telecommunication network switching system including:
    a first serving switch;
    a tandem switch;

a second serving switch;

a first memory containing stored logical listings corresponding to a group of paths, having substantially identical electrical delays, over which digital channel connections linking said first serving switch and said tandem switch may be effected, said stored logical listings being indexed within said first memory according to the electrical delay of each corresponding path; and a second memory containing stored logical listings corresponding to paths, having substantially identical electrical delays, over which digital channel connections linking said tandem switch and said second serving switch may be effected, said stored logical listings being indexed within said first memory according to the electrical delay of each corresponding path;

a method of effecting on-demand, multiple digital channel connections between a first network subscriber and a second network subscriber, comprising the steps of:

establishing a digital channel connection between said first network subscriber and said second network subscriber via said first serving switch, said tandem switch, and said second serving switch, in response to each of a plurality of sequential requests communicated to said serving and network switches via a D-Channel message from said first network subscriber to initiate a digital channel connection to said second network subscriber, such that a plurality of digital channel connections that traverse paths corresponding to logical listing stored in said first memory which are indexed as having substantially identical electrical delays are established between said first serving switch and said tandem switch, and a plurality of digital channel connections that traverse paths corresponding to logical listings stored in said second memory which are indexed as having substantially identical electrical delays are established between said tandem switch and said second serving switch.

* * * * *